Dec. 29, 1964    R. L. MEEDER ETAL    3,163,756
SAMPLE-CONVEYING AND LIGHT-SEALING MECHANISM
FOR SCINTILLATION COUNTING
Filed April 3, 1962    2 Sheets-Sheet 1
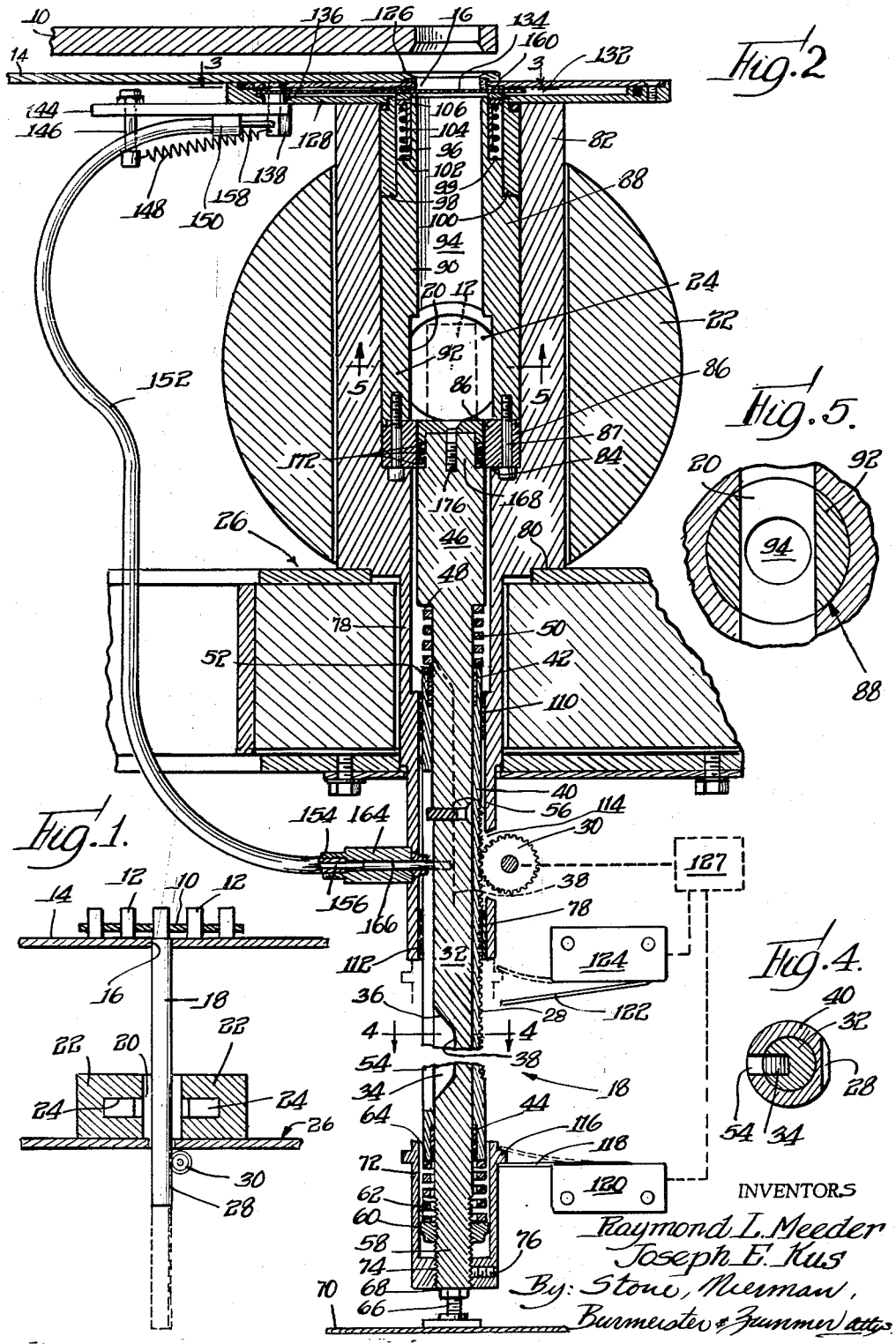

Dec. 29, 1964   R. L. MEEDER ETAL   3,163,756
SAMPLE-CONVEYING AND LIGHT-SEALING MECHANISM
FOR SCINTILLATION COUNTING
Filed April 3, 1962   2 Sheets-Sheet 2
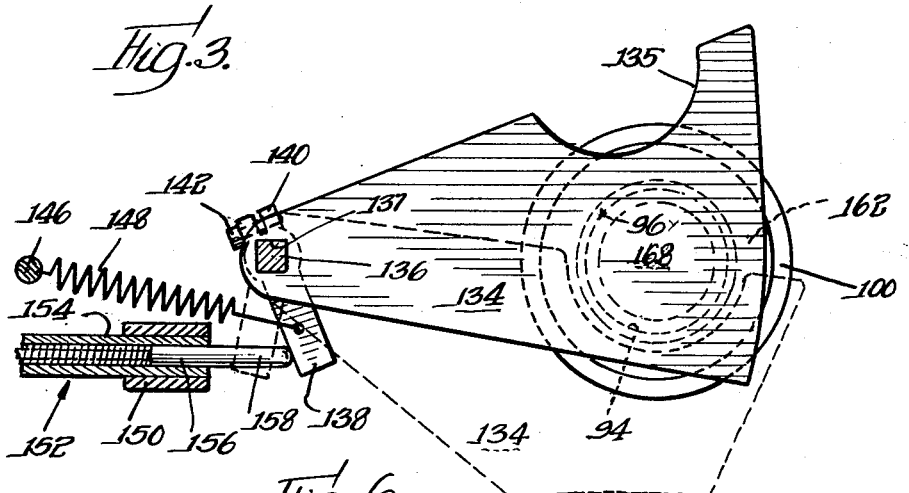
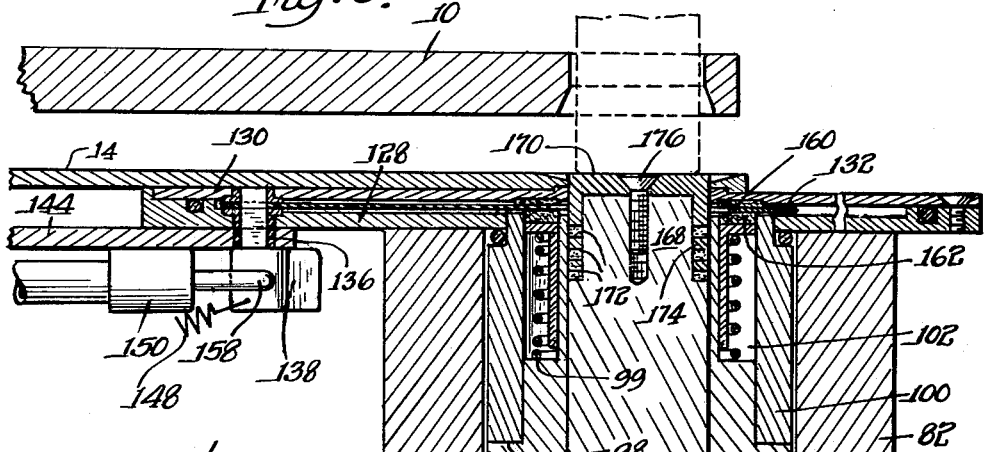
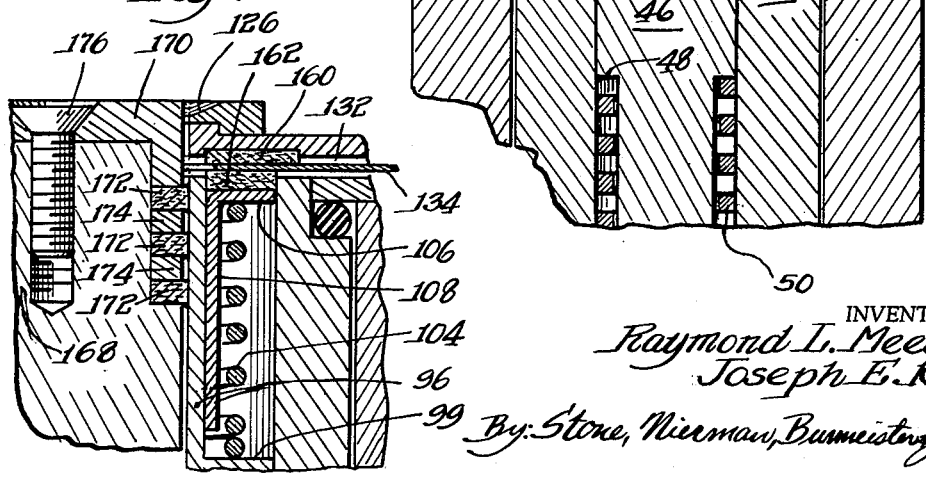
INVENTORS
Raymond L. Meeder
Joseph E. Kus
By: Stone, Nieman, Burmeister & Zummer
Attys United States Patent Office 3,163,756
Patented Dec. 29, 1964

3,163,756
SAMPLE-CONVEYING AND LIGHT-SEALING MECHANISM FOR SCINTILLATION COUNTING
Raymond L. Meeder, Palos Heights, and Joseph E. Kus, Mount Prospect, Ill., assignors to Nuclear-Chicago Corporation, Des Plaines, Ill., a corporation of Delaware
Filed Apr. 3, 1962, Ser. No. 184,765
25 Claims. (Cl. 250—71.5)

This invention relates to automatic equipment for sequential processing of individual items, and more particularly to an automatic device for the measurement of the activity of successive radioactive samples. The invention as herein described is of the unique utility in automatic equipment for exposing liquid scintillation samples to measurement by exposure to highly sensitive photomultipliers.

The general techniques of scintillation counting as a method of measuring radioactivity are well-known, a scintillator producing light in response to ionizing radiations, either emitted directly from the substance under measurement or produced in response to emissions which are themselves non-ionizing. In the most common uses of the general method, a solid crystal is employed as the scintillator, the crystal normally being incorporated in a light-tight housing with one or more photomultipliers, such a housing being required in order that ambient light be excluded from the photosensitive multiplier cathode. Such systems, although in widespread use, have severe limitations in the measurement of weak beta particles, which are subject, when measured by placement adjacent to the light-opaque "window" of such a device, to many factors of inefficiency in the measurement, including self-absorption in the sample, solid angle of radiations from the sample subtended by the scintillator (geometry), and scattering and absorption by the ambient air and the counter window itself. Accordingly, normal types of scintillation counting are poorly suited for measurements on such weak beta emitters, particularly in applications requiring measurements of the energy spectrum of the emitted betas, as in chemical analysis. In recent years, there has accordingly come into use a technique or method known as liquid scintillation counting, in which the sample under measurement is dissolved or suspended, homogeneously or in a matrix such as an impregnation of thin paper, in a liquid scintillator; less common variants employ, for example, where the substance under measurement is not soluble in such scintillators, a solid scintillator matrix of a porous consistency, filled with a solution of the material under meaurement which is itself non-scintillating.

In the making of such a measurement, the scintillating composition, wholly or partially liquid, is placed in a bottle or vial and exposed to one or more photomultipliers, the system being designed, of course, for most efficient light transfer and for very highly sensitive detection of the relatively weak scintillations. In maximizing the efficiency, it is of course necessary to perform the measurement with the greatest possible shielding against ambient light, i.e., in absolute darkness, and to employ photomultipliers of maximum gain and of lowest dark current and noise. The latter factors are, as is well-known, a function of temperature, and it is accordingly desirable to operate such systems under conditions of refrigeration. However, an additional problem, which is also well-known, is that the low-noise characteristics of such photomultipliers are destroyed by exposure of the photo-cathode to any light other than the extremely feeble scintillations which they are designed to measure. Accordingly, in introducing a scintillation vial or bottle to the region of exposure to the photomultipliers (normally, for purposes of efficiency, in a small chamber between two mutually facing end-sensitive photomultiplier tubes designed for such purposes), it is necessary to assure that no light enters either in such introduction of the liquid scintillation vial or bottle, or in its removal. Under these conditions, systems designed for manual insertion of samples under ordinary ambient light conditions are relatively impractical, and various mechanical systems for such introduction of samples have accordingly been designed for use in chemical laboratories and similar installations.

The more advanced types of systems for this purpose are fully automatic counting and sample-changing systems, in which a large number of sample vials are counted in sequence, being introduced to the exposure chamber through light locks at all times guarding the photomultipliers from ambient light. Normally, such automatic sample changers, like other types of radioactive sample changers, have some form of conveyor system delivering each successive sample to a standard position, whence it is removed to the counting chamber, the counting measurement (with or without energy discrimination) performed, and then returned to the conveyor system for storage, with or without subsequent recycling.

The automatic sample changers, and particularly the portions thereof which handle the vials in their passage from the conveyor system to the exposure chamber and back to the conveyor system, have heretofore been relatively complex and expensive. They have in general employed a multiplicity of mechanical light-shutters, or gates, sequentially operated in the introduction and removal of each sample into and from the exposure chamber. It will be seen that there are various manners in which this may be done. As an obvious example, an intermediate chamber may be provided, with the sample path including two light-tight openable access doors or sliding plates, the sample being introduced into the intermediate chamber through the outer door or similar opening while the inner is closed, the closing of the outer shutter formed by such door or plate being followed by the opening of the inner shutter and introduction of the sample to the exposure chamber, with reversal of this process after the counting operation is complete. As another example, the auxiliary shutter (or shutters) may, rather than being in the access path of the sample, be employed to cap or shield the exposure chamber itself from the light detection device or devices, with ambient light being permitted to enter the chamber upon opening of the single shutter through which the sample enters the chamber. All of such devices introduce substantial complexity of the mechanism.

A further complexity of mechanisms heretofore employed for this and generally similar purposes stems from the requirement of exact and completely reproducible positioning of each sample vial with respect to the photomultipliers. Any deviation in exact reproduction of the positioning of each successive vial, which are of course all identical in any system for this purpose, produces a corresponding deviation in the portion of the sample "seen" by the light-detection devices, so that the geometry or overall efficiency is altered and the results accordingly spurious. Thus, the position of the carrier which places the sample vial in the chamber either must be completely standard and fixed, or else further complexity must be introduced by removing control of the sample vial position from the introducing carrier, as by withdrawing it after depositing the vial on some retaining surface.

One simple form of conveyor system which is frequently employed for the handling of vials, bottles, and similar objects, for other purposes is a wheel, chain, or belt, etc., moving over a flat table surface, with the vials or bottles constituting the "load" of the conveyor loosely guided by suitable vertical guides and slidingly supported. Such a simple conveyor system may readily be employed to position successive vials over an opening or aperture in the table, through which they may be introduced into the counting region. One simple type of carrier which may be employed for such removal from the conveyor system is, of course, a mere flat-ended ram or elevator which seats in the aperature as each successive vial or bottle is placed thereon, then withdrawing downward, so that no fastener or gripper need be employed in handling. Such a simple system, however, requires that the upper surface of the carrier be very exactly positioned, in order that each successive vial or bottle will slide onto it gently and accurately without complicating the conveyor system either by imposing excessive accuracy requirements on its positioning of the successive samples on the elevator, or by providing a gripping and dropping mechanism rather than the simple sliding operation.

It is the principal object of the present invention, accordingly, to provide an automatic system of the type described which accomplishes the necessary requirements of a fully satisfactory liquid scintillation counting system as described above in an extremely simple and relatively inexpensive manner, with a minimum number of relatively simple moving parts, with a minimum requirement of adjustment and readjustment in manufacture and in operation and use, and with a maximum of assurance of continuous long-lived accurate and efficient operation, free of difficulties due to either jamming or other malfunction of the vial-handling mechanism, or to exposure of the photomultipliers to external light, during introduction or removal of samples, or otherwise.

Subsidiary to this principal object of the invention, there have been realized a number of improvements which, although they are particularly useful for the principal or original purpose or object mentioned above, will be found to be of great advantage for purposes which, although not identical, may be considered analogous as regards the advantages obtained by some of the broader aspects of the invention. As an obvious example, the simplicity of the present system for introducing and counting the scintillation samples is such that it is economically feasible to construct counting systems for occasional or intermittent use without the mass and complexity of a conveyor system, i.e., with sample vials manually placed on, and removed from, the elevator system. Further, the principle of the mechanism may readily be adapted in many forms for the introduction of objects other than radioactive samples into darkened chambers for processing of various types. In addition to the adaptability of the overall system, including all its features, for different purposes than that specifically described herein, particular features of the construction may be individually utilized where certain of the auxiliary features are not indispensable.

The invention is most readily understood in both the general principles of construction it provides, and in its more detailed features, from consideration of the embodiment illustrated in the attached drawing, in which:

FIGURE 1 is a highly schematic sketch showing in skeleton form the general type of scintillation counter sample changer in the mechanism of which the invention is employed in the embodiment illustrated in the subsequent figures;

FIGURE 2 is a view in vertical section showing in detail a construction of the device of FIGURE 1 in accordance with the invention;

FIGURE 3 is a fragmentary horizontal sectional view taken along the offset line 3—3 of FIGURE 2 in the direction indicated by arrows;

FIGURE 4 is a horizontal sectional view taken along the line 4—4 of FIGURE 2 in the direction indicated by arrows;

FIGURE 5 is a horizontal sectional view taken along the line 5—5 of FIGURE 2 in the direction indicated by arrows;

FIGURE 6 is a fragmentary vertical sectional view of the top of the ram or elevator when in the raised position, rather than in the lowered position illustrated in FIGURE 2; and FIGURE 7 is a further enlarged fragmentary view corresponding to a portion of FIGURE 6, but enlarged to show in slightly exaggerated form the manner in which light is excluded from the interior of the device in this portion of the cycle of operation.

Referring first to the schematic representation of FIGURE 1, showing the general type of device in which the invention is herein illustrated, the conveyor 10, which may be a wheel, chain or other conveyor structure, is shown as bearing or transporting a series of sample bottles or vials 12, the bottoms of which slide on a table surface 14 as the conveyor moves them. The latter is, of course, operated intermittently rather than continuously, depositing each successive bottle or vial 12 within an aperture 16 in which is seated the top end of an elevator ram assembly 18, which lowers the sample into a chamber 20 enclosed by shielding 22 of lead or similar material, in which are disposed photomultipliers 24 employed to detect the scintillations. It will of course be understood, from what has previously been said, that the simplified schematic drawing of FIGURE 1 omits the showing of any provision for excluding light from the chamber. The shield 22 and light-detectors 24 are mounted on a support shelf 26, and the ram or elevator 18 is appropriately moved up and down by the formation of a rack 28 cooperating with a pinion gear 30 beneath the shelf.

The general or overall orientation and function of the gross mechanism illustrated schematically in FIGURE 1 being understood, the nature and operation of the novel structure of the invention, shown in the succeeding figures, may be described. It will be seen that the ram 18 has on its axis a cylindrical inner rod 32 having a longitudinally extending cam slot 34 in the lower central portion thereof. The cam slot 34 has a sloping cam surface 36 at the upper end, below which the cam surface is a straight vertical line 38. Surrounding the inner rod 32 is a concentric drive tube 40 slidingly mounted with respect to the inner rod 32 by upper and lower bearing sleeves 42 and 44, for example of nylon.

The upper end portion 46 of the inner rod 32 is of enlarged diameter substantially corresponding to the outer diameter of the drive tube 40, the lower end of this enlarged portion thus forming a shoulder 48. A coiled spring 50 is compressed between the shoulder 48 and the upper end 52 of the drive tube 40. The drive tube has a longitudinal slot 54 along the bulk of its length, and a guide pin 56 extending radially from the inner rod 32 in longitudinal alignment with the cam slot 34 maintains the latter in register with the slot 54 in the drive tube.

The lower end 58 of the central rod 32, extending downward beyond the drive tube, is externally threaded, and a nut 60 compresses a spring 62 against the lower end 64 of the drive tube 40.

It will be seen that the structure as so far described produces the result that the upper end portion 46 of the central rod 32 has an equilibrium longitudinal position with respect to the drive tube 40, in which the forces exerted by the springs 50 and 62 are balanced, but is essentially "floating" in this position, since it is completely spring-suspended for longitudinal motion within the drive tube on either side of the equilibrium position, the latter being simply adjustable in assembly to produce a desired condition of balance while permitting reasonably wide latitude of tolerance in exact force of the upper and lower springs.

Beneath the ram 18 is a limit stop 66 adjustable in height by means of a nut 68, the stop being mounted on a fixed base plate 70.

A cup 72 has its bottom threadedly apertured at 74 and engaging the threaded lower end 58 of the rod 32, being thus vertically adjustable and locked into position by a set-screw 76.

The entire ram reciprocates in a stationary guide tube or housing 78 extending downward through the shelf structure 26, the upper portion of the guide tube or housing 78 being of enlarged diameter to form a shoulder 80 resting on the shelf 26. Above this shoulder portion the housing is internally enlarged to contain structure to be described below, the upper tubular portion 82 of the housing extending up to a point slightly beneath the table 14. It will be understood that the entire portion of the housing 78 above the shelf 26 is illustrated in the drawing as being of one-piece construction for purposes of simplicity of illustration, although in practical construction the housing 78 is best fabricated in sections secured together by appropriate bolts.

At the lower end of the upper tubular portion 82 of the housing 78, the above-mentioned enlargement of the internal diameter forms a shoulder 84 on which is seated an annular ring 86 secured by screws 87 to an upper liner or body 88. The body 88 in its vertically central portion 90 of the liner or body 88 constitutes a thick cylindrical tube. The lower portion 92 (see FIGURE 5) is machined to form the chamber 20 between opposed photomultipliers 24 encased in the shield 22. Above the chamber 20 thus formed, the central aperture 94 in the liner 88 extends to the top of the device. The upper end portion 96 of the liner 88 is machined down to successively smaller outer diameters to form successive shoulders 98 and 99. A collar 100 seated on the outer or lower shoulder 98 forms an annular cavity 102 between its inner surface and the outer surface of the extreme upper end of the liner or body 88. In this cavity is a coiled spring 104 acting between the shoulder 99 defining the bottom of the cavity and a radial flange 106 on a tube 108 slidingly mounted on the exterior surface of the end portion of the liner.

The ram 18 is mounted for reciprocation in the housing 78 by upper and lower bearing sleeves 110 and 112 in the lower portion of the housing. The latter has a cutaway aperture at 114 through which the pinion gear 30 engages the rack 28 formed on the drive tube 40 of the ram diametrically opposite the slot 54. The upper end of the cup 72 is formed with an annular switch-trip protrusion 116 shown as engaged with a switch-arm 118 of a lower limit-switch 120 (the unactuated position of the arm being shown in dotted form in FIGURE 2). In the upper position of the ram, the upper edge of the cup 72 abuts against the lower end of the stationary guide tube 78, the arm 122 of an upper limit-switch 124 being engaged by the switch-trip 116 as shown in dotted form in FIGURE 2.

The elevator or ram system as thus described is greatly advantageous in the overall system of FIGURE 1 both from the standpoint of performance and from the standpoint of economy in manufacture as compared with other systems with which comparable performance may be obtained. The exact lower position of the ram is fixed by the adjustment 68 of the bottom stop 66 to produce optimum exposure of samples 12 to the multipliers 24 when the ram is in this position. The upper position of the ram is accurately fixed by adjustment of the cup 72 by means of its threaded engagement 74 with the upper end of the ram structure, and is likewise reliably stable upon tightening of the set-screw 76. As previously indicated, exact vertical positioning in this condition is required in order to minimize the required accuracy and complexity of the conveyor system 10 (illustrated as a wheel with peripheral apertures containing the samples, which accordingly successively slide into position with each progression of the conveyor). The region of the table surface 14 surrounding the aperture 16 through which the samples are placed on the ram or elevator is beveled as indicated at 126. This bevel or taper minimizes the possibility of jamming of samples, avoiding the striking of any sharp corner as a sample slides off the ram and also permitting gravitational centering as the ram is withdrawn downward, in the event the conveyor itself does not produce perfect register with the aperture. It will be observed that if the top of the ram is substantially above its proper position, the sample will jam against its side rather than sliding onto the top of the ram. Likewise, if the ram is substantially below its proper position when the sample has been counted and is being returned to the conveyor, the commencement of motion of the conveyor will jam the sample against the side of the table aperture. With the present mechanism, this upper position is, like the lower position, fixed with complete accuracy by the adjustment of the cup 72.

The construction employed for fixing the upper and lower positions of the ram avoids any necessity for making elaborate provisions in the motor system, schematically shown at 127, by which the gear 30 is driven, either to assure proper positioning or to prevent damage to the motor or the gear system. The precision of adjustment of the positions of the switch-arms 118 and 122 is relatively uncritical. A high gear ratio is employed in the drive (not illustrated) for the gear 30, thus at the same time enabling the use of a relatively low-power motor and locking the rack 28 in position once it comes to rest after withdrawal of power from the drive. The springs 50 and 62 are of such size and resiliency as to transmit to the outer tube of the ram, bearing the rack, substantially no impact shock when the central rod 32 reaches its fixedly limited terminal position in either direction. The switch 120 or 124 is actuated to shut off the power to the motor drive through a suitable relay system before engagement of the stop surfaces secured to the central or sample-holding portion of the ram and the corresponding surfaces on the stationary part of the device, and the inertia carries the sample-holding portion to its terminal position, reached at a point of greatly slowed motion, and then compresses the applicable spring, only the degree of such latter compression being affected by reasonably wide differences in exact positioning of the limit switches or by changes in system friction producing changes in final terminal positions of the rack, with respect to which the sample-holding portion of the ram is spring-floated in both directions. As may be seen, this construction is extremely simple and trouble-free as compared with other constructions capable of producing comparable positioning accuracy with the gradual and shock-free deceleration required in the handling of the relatively fragile vials.

As previously indicated, the system is provided with a novel and simple mechanism, cooperating with the ram structure thus far described, to protect the photomultipliers 24 from ambient light. Between the top end of the ram or elevator guide or housing 78 and the under surface of the table 14 are lower and upper plates 128 and 130 respectively, the former being apertured to pass the flange 106 on the sliding tube 108 previously described, and the latter having an aperture matching the access aperture in the table 14. These two plates are slightly separated to form a thin horizontal space 132 containing a shutter 134 consisting of a more or less triangular thin metal sheet with an arcuate notch 135 in one edge. A pivot pin 136 is coupled to the shutter by a portion of its shank formed of square cross-section, fitted to a corresponding square aperture 137 in the pivoted end of the shutter. A crank block 138 is coupled to the shutter by having a split collar 140 formed on one end and secured by a clamping screw 142 sufficiently loosely to create a friction coupling preventing mechanical damage if the shutter should become jammed. The pivot is mounted in appropriate bearings in the plates 128 and 130. A bracket 144 (omitted, like plate 128, from the showing of FIGURE 3) mounts a post 146, to which is secured one end of a spring 148, the other end of which is secured to the crank 138.

Adjacent to the crank 138, a clamp 150 secures the end of a control-wire cable 152, the sheath 154 being anchored by the clamp, and the axial or drive wire 156 being provided with an extending end-pin 158 against which the crank 138 is held by the spring 148. As shown in FIGURE 3, the shutter overlies the ram or elevator aperture 94 when the control wire 156 is advanced, but is returned by the spring 148 to the open position (shown dotted in FIGURE 3) when the control wire is withdrawn.

Annular light-seal gaskets or washers 160 and 162 on the under surface of the plate 130 and on the upper surface of the flange 106 assure light-tightness of the shutter when closed, the spring 104 lightly compressing these gaskets against the region of the shutter surrounding the access aperture.

The cable 152 extends down through the shelf 26 and terminates at the other end in a fitting 164 threaded into an aperture in the lower region of the guide tube 78, the end-pin 166 on the wire 156 extending through the slot 54 in the outer tube of the ram assembly and being maintained by the spring 148 in contact with the central rod 32, so that the surface of the rod defines a longitudinal cam operating the shutter. As shown in FIGURE 2, when the ram or elevator is in the lowered position in which the sample is in the chamber for exposure to the photomultipliers, the shutter is closed, but is opened when the ram goes through the intermediate range of its stroke corresponding to the upper sloped surface 36 of the cam slot 34, and thereafter remains open until the final upper position is reached, as shown by the dotted indication in FIGURE 2 of the cam-and-follower condition assumed in the raised position. The shutter thus keeps the device light-tight during the counting operation and for the first portion of the upward stroke of the ram.

Light-tightness of the chamber after the shutter commences to open as the ram rises, and thereafter during the change of samples until the shutter is again closed as the ram or elevator decends with the new sample, is maintained by the maintenance of a light seal between the inner surface of the chamber aperture 94 and the upper end of the ram or holder assembly in this portion of the cycle of operation. The upper end 168 of the upper portion of the rod 32 is of reduced diameter, and is provided with a cup-shaped cap 170. Alternated washers of felt or similar material 172 and of metal 174 are compressed between the lower edges of the cap and the upwardly facing shoulder on the end portion 46 of the rod 32 by an axial screw 176 which secures the cap in position. The cam slot 34 commences sufficiently far down on the sample-holding rod so that the shutter does not commence to open until these light-seal washers have traversed the chamber and are in light-seal engagement in the aperture 94. The washers forming this seal are removed from the extreme upper end of the ram by a distance greater than the height of the space between the table and the upper end of the liner 88, i.e. the space provided for the shutter and its associated gaskets, so that the light seal surrounding the upper end of the ram exists at all times when the shutter is wholly or partially open.

As previously observed, it will be obvious to persons skilled in the art that many modifications of the specific device illustrated in the drawing may be made, some immediately obvious and others observable after study, which differ in detail from the particular construction shown, but nevertheless employ the teachings of the invention. Although the invention is most advantageously employed in the overall combination of novel features employed in a scintillation counter sample changer, it will further be obvious that particularly features may advantageously be employed individually, either in the same type of device or in devices which are analogous. Accordingly, the scope of the patent protection to be afforded the invention should not be confined to the particular embodiment illustrated and described above, but is defined in the appended claims.

What is claimed is:

1. A device for scintillation counting and analogous purposes comprising wall means defining a chamber, a light-responsive detector exposed to light appearing within the chamber, an elongated passage connecting the chamber with the exterior, a sample-holder movable through the passage, a light-tight resilient seal member extending between the outer surface of the holder and the inner surface of the passage in light-tight sliding engagement, and means for moving the holder between an innermost position at a point positioning a sample thereon in the chamber and an outermost position wherein the sample is on the exterior of the chamber, a shutter in the passage having a closed position blocking the entry of exterior light into the chamber and an open position withdrawn from the passage, and means for operating the shutter as the holder moves through the passage.

2. A device for scintillation counting and analogous purposes comprising wall means defining a chamber, a light-responsive detector exposed to light appearing within the chamber, an elongated vertical passage connecting the top of the chamber with the exterior, a sample-holder movable through the passage, a light-tight resilient seal member extending between the outer surface of the holder and the inner surface of the passage in light-tight sliding engagement, means for moving the holder between a lowermost position at a point positioning a sample thereon in the chamber and an uppermost position at the upper end of the passage, a shutter at the top of the passage having a closed position blocking the entry of exterior light into the passage and an open position withdrawn from the passage, and means for operating the shutter as the holder moves through the passage, the shutter sealing out light from the chamber when the holder is in lower positions and the resilient seal member sealing out light from the chamber when the shutter is open.

3. A device for scintillation counting and analogous purposes comprising an enclosure with an access aperture, wall means defining a chamber within the enclosure, a scintillation-responsive detector exposed to light within the chamber, an elongated passage connecting the chamber with the aperture, a sample-holder assembly movable through the passage, a resilient light seal member extending between the holder assembly and the inner surface of the passage for light-tight sliding engagement, a drive member, opposed springs positioning the holder assembly on the drive member, stop members engaging the holder assembly to fix the innermost position of the holder assembly at a point positioning an object thereon in the chamber and the outermost position of the holder assembly at a point positioning the outer end thereof in the aperture, an electric motor having substantial inertia coupled to the drive member, limit switches activated by the holder assembly to inactivate the motor immediately before each of said extreme positions is reached, said stop members being engaged by inertia of the motor, a pivotally mounted shutter plate having a closed position blocking the entry of exterior light into the passage and an open position withdrawn from the aligned passage and aperture, a longitudinal cam on the holder assembly, and a control cable having one end of its movable drive member on the cam and its other end coupled to the shutter to operate the shutter, the shutter sealing out light from the passage and the chamber when the holder assembly is in inner positions and the resilient light seal member sealing out light from the chamber when the shutter is open.

4. A scintillation counting device comprising an enclosure with a top surface having an access aperture, a chamber below the aperture, a scintillation-responsive detector facing upon the chamber, an elongated vertical passage connecting the chamber with the aperture, a sample-holder rod having its upper end movable through the passage, a resilient light seal member between the outer surface of the holder rod and the inner surface of the passage in light-tight sliding engagement, the portion of the holder rod below said upper end being of reduced transverse dimensions, a drive tube surrounding the central portion of the rod, a guide at least partially below the chamber maintaining the drive tube in alignment with the passage, springs compressed between the upper and lower ends of the drive tube and the respective extending portions of the rod, stop members rigidly engaging the rod to fix the lowermost position of the rod at a point positioning a sample thereon in the chamber and the uppermost position of the rod at a point positioning the upper end thereof in the aperture, drive means engaging the drive tube, limit switches activated by the rod to inactivate the drive means immediately before each of said extreme positions is reached, said stop members being engaged by inertia of the drive means, a pivotally mounted horizontal shutter plate having a closed position blocking the entry of exterior light into the passage and an open position withdrawn from the aligned passage and aperture, a crank on the shutter, a longitudinal cam on the surface of the sample-holder rod, and a control cable having one end of its movable drive member seated against the cam surface and the other end coupled to the crank to operate the shutter, the shutter sealing out light from the passage and the chamber when the rod is in lower positions and the light seal member sealing out light from the chamber when the shutter is open.

5. A scintillation counting device comprising an enclosure with a top surface having an access aperture, a chamber below the aperture, a scintillation-responsive detector facing upon the chamber, an elongated vertical passage connecting the chamber with the aperture, a sample-holder rod having its upper end slidingly fitting the passage and bearing a surrounding resilient protrusion engaging the inner surface of the passage for light-tight sliding motion and having the portion thereof below said upper end of reduced transverse dimensions, a drive tube surrounding the central portion of the rod and having a rack formed thereon, a guide at least partially below the chamber maintaining the drive tube in alignment with the passage, springs compressed between the upper and lower ends of the drive tube and the respective extending portions of the rod, a lower stop member engaging the rod to fix the lowermost position of the rod at a point positioning a sample thereon in the chamber, a stop member on the lower portion of the rod engaging the lower end of the guide to fix the uppermost position of the rod at a point positioning the upper end thereof in the aperture, a pinion engaging the rack, limit switches activated by the rod to inactivate the pinion drive immediately before each of said extreme positions is reached, said stop members being engaged by inertia of the pinion drive, a light-seal member surrounding the access aperture on the under side of the top surface of the enclosure, a second light-seal member surrounding the passage at the upper end thereof, spring means urging said light-seal members into abutment, a pivotally mounted horizontal shutter plate having a closed position fully between said last light-seal members and blocking the entry of exterior light into the passage and an open position withdrawn from the aligned passage and aperture, a crank on the shutter, a shutter spring biasing the shutter to the open position, a longitudinal cam slot in the surface of the lower portion of the sample-holding rod, an access slot in the drive tube in register with the cam slot, a control cable having the lower end of its movable drive member extending through the access slot and having its upper end seated against the crank, said lower end of the cable drive member seating against the outer surface of the rod in the lowered position of the rod and entering the cam slot under urging of the shutter spring when the rod is in an intermediate position with its upper end in the passage to reverse the position of the shutter, the shutter sealing out light from the passage and the chamber when the rod is in lower positions and the resilient protrusion on the rod sealing out light from the chamber when the shutter is open.

6. In a device for scintillation counting or analogous purposes, wall means defining a chamber, a light-sentitive detector positioned to detect light in the chamber, a passage connecting the chamber with the exterior, a holder reciprocable through the passage and having an inner position with its end on the opposite side of the chamber from the passage so that an object on the end thereof is exposed to the detector and an outer position with said end at the outer end of the passage, means to interpose a resilient opaque light seal between the inner surface of the passage and the outer surface of the holder affixed to one of said surfaces to block light from the chamber when the holder is in the passage, a light shutter in the outer portion of the passage, and means to open the shutter as the holder is moved outwardly through the passage with said seal so interposed and to close the shutter as the holder is moved inwardly through the passage with said seal so interposed.

7. In a device for scintillation counting or analogous purposes, wall means defining a chamber, a light-sensitive detector positioned to detect light in the chamber, an opening in the chamber, a holder assembly having its outer end reciprocable through the opening and having an inner position wherein said end is within the chamber, a light shutter sealing the opening, a cam surface on the holder assembly, and a control element having one end portion in contact with the cam surface and the other end portion coupled to the shutter, the control element opening and closing the shutter as the holder assembly moves outwardly and inwardly, respectively.

8. The device of claim 7 wherein said other end portion is frictionally coupled to the shutter to avoid damage to the mechanism in the event of jamming of the shutter.

9. The device of claim 7 having auxiliary means operable prior to the opening of the shutter during the outward motion of the holder assembly to form a light seal between the holder assembly and the wall of the opening to block the admission of light to the detector while the shutter is open.

10. In a device for scintillation counting or analogous purposes, wall means defining a chamber, a light-sensitive detector positioned to detect light in the chamber, a passage connecting the chamber with the exterior, a holder reciprocable through the passage and having an inner position with its end on the opposite side of the chamber from the passage so that an object on the end thereof is exposed to the detector and an outer position with said end at the outer end of the passage, a resilient opaque light seal interposed between the inner surface of the passage and the outer surface of the holder and affixed to one of said surfaces to block light from the chamber when the holder is in the passage, and means to block light from the chamber when the holder is withdrawn inwardly from the passage.

11. The device of claim 10 wherein the resilient seal comprises a plurality of longitudinally spaced light-opaque flexible washers.

12. In a device for precision positioning of scintillation samples and analogous objects, a housing, a drive tube, a holder rod protruding from the drive tube, springs acting between the opposite ends of the drive tube and the adjacent portions of the rod, guide means for mounting the drive tube for reciprocating motion in the housing, rigid mechanical stop means on the housing and on the rod selectively engaging to limit the motion of the rod in both directions, electric motor drive means of substantial inertia reversibly driving the drive tube, and limit switches activated by the rod as the rod approaches its limit of motion in each direction and coupled to the motor to inactivate the motor, the inertia of the motor carrying the rod to its fixed limit and compressing the spring in each direction.

13. The positioning device of claim 12 having both ends of the holder rod extending from the drive tube and means forming radial protrusions on said ends, the springs acting between the ends of the drive tube and the respective radial protrusions.

14. The positioning device of claim 12 having cam means to operate an auxiliary mechanism at a fixed point of motion of the rod comprising a groove in the surface of the rod within the drive tube, the drive tube being slotted to permit access to the groove.

15. The positioning device of claim 14 having a pin affixed to the rod and slideable in the slot to hold the slot in rotational register with the groove.

16. An automatic changing device for scintillation samples and analogous objects comprising, in combination, the positioning device of claim 12 having an apertured upper surface, the rod having a flat upper end substantially flush with said surface in its upper position, and conveyor means above said surface to push each successive object thereon along said surface onto the end of the rod while simultaneously removing the predecessor object therefrom.

17. The scintillation sample changer of claim 14 having a movable shutter adapted to block light from the photosensitive device and cam means at least partially on the portion of the rod within the drive tube for operating the shutter, the drive tube being apertured in the region of the cam means.

18. In a device for precision positioning of small objects in radiation counting and analogous processing, a housing, a drive member mounted in the housing, an object holder spring-mounted on the drive member and adapted to receive objects to be processed, rigid stop means on the housing and on the holder fixing opposite extreme positions of the holder, at least one of said positions being a processing position, an electric motor of substantial inertia reversibly driving the drive member, and limit switches activated by the holder as the holder approaches its extreme positions and coupled to the motor to inactivate the motor, the inertia of the motor carrying the holder to each of the positions fixed by the stop means.

19. In a device for scintillation counting and analogous purposes, means for defining a light-tight enclosure, a light-sensitive element within the enclosure, a passage extending between the enclosure and the exterior, a holder having a forward end portion receiving an object to be measured and movable through the passage between advanced and withdrawn positions wherein the holder respectively extends through and is withdrawn from the passage, an object on said end portion being within the enclosure in one of said positions and outside the enclosure in the other of said positions, first light-sealing means in a portion of the passage substantially spaced from the end of the passage first traversed by the object in advancing motion of the holder, said first light-sealing means blocking the entry of light into the enclosure when the holder is withdrawn, and means for forming a light seal between the holder and the wall of the passage when said forward end portion of the holder is in the region between said end of the passage and the first light-sealing means, so that the blocking of light from the enclosure is not then dependent on the first light-sealing means, and the object may be moved through the passage upon opening of the first light-sealing means without admitting light to the enclosure.

20. The device of claim 19 wherein said first light-sealing means is an opaque shutter extending across the passage.

21. The device of claim 20 having means responsive to the position of the holder to open and close the shutter.

22. The device of claim 7 having the opening extending substantially inward of the shutter, the shutter opening and closing when the end of the holder assembly is in the inward portion of the opening, and having means for forming a light seal between the holder assembly and the wall of the opening at all times when the shutter is open.

23. The device of claim 19 having the first light-sealing means comprising a shutter extending across the passage and the means for forming the light-tight seal between the holder and the wall of the passage comprising an opaque ring of resilient light-sealing material mounted on the holder for motion into and out of the passage and engaging the wall for forming of the seal.

24. The device of claim 19 wherein said passage is vertical, the first light-healing means comprising a horizontal shutter plate at the top of the passage and a cam-drive coupling between the shutter plate and the holder operating the shutter plate in accordance with the position of the holder, the means for forming a light seal between the holder and the wall of the passage comprising an opaque annular member surrounding the holder and engaging the wall of the passage during the raising of the holder prior to the opening of the shutter plate and disengaging from the wall of the passage during the lowering of the holder only after the closing of the shutter plate.

25. The device of claim 24 having a holder assembly including an elongated holder-support portion extending down through the enclosure when the holder is fully raised, and having a shutter-operating portion secured to the lower end of the holder-support portion, the cam-drive coupling including an elongated control member having its upper end portion at all times coupled to the shutter and its lower end portion coupled at all times to said shutter-operating portion.

References Cited by the Examiner
UNITED STATES PATENTS 1,911,015  5/33  Crabbe.
2,924,718  2/60  Packard _____ 250—106

RALPH G. NILSON, *Primary Examiner.*